(12) United States Patent
Jensen et al.

(10) Patent No.: US 7,329,296 B2
(45) Date of Patent: Feb. 12, 2008

(54) FILTER BAG AND A FILTER DEVICE PROVIDED WITH SUCH FILTER BAG

(75) Inventors: Arne Jensen, St. Fuglede (DK); Keld Christensen, Ruds Vedby (DK)

(73) Assignee: Simatek A/S, Jerslev Sj. (DK)

( * ) Notice: Subject to any disclaimer, the term of this patent is extended or adjusted under 35 U.S.C. 154(b) by 352 days.

(21) Appl. No.: 10/511,329

(22) PCT Filed: Apr. 14, 2003

(86) PCT No.: PCT/DK03/00254

§ 371 (c)(1),
(2), (4) Date: Dec. 16, 2004

(87) PCT Pub. No.: WO03/086581

PCT Pub. Date: Oct. 23, 2003

(65) Prior Publication Data

US 2005/0138903 A1    Jun. 30, 2005

(30) Foreign Application Priority Data

Apr. 15, 2002   (DK) ............................ 2002 00106 U

(51) Int. Cl.
*B01D 29/27*   (2006.01)
*B01D 46/02*   (2006.01)

(52) U.S. Cl. ..................... 55/379; 55/381; 55/382; 210/448; 210/452; 210/453; 210/488

(58) Field of Classification Search ............ 55/379, 55/381, 382; 210/448, 452, 453, 488
See application file for complete search history.

(56) References Cited

U.S. PATENT DOCUMENTS

| 4,220,459 A | * | 9/1980 | Hammond et al. ........ 55/341.1 |
| 4,276,069 A | | 6/1981 | Miller |
| 4,293,321 A | | 10/1981 | Kordas |
| 5,096,476 A | | 3/1992 | Hunsberger |
| 5,643,451 A | * | 7/1997 | Harris et al. ................ 210/448 |
| 6,966,444 B2 | * | 11/2005 | Morgan ..................... 210/448 |

FOREIGN PATENT DOCUMENTS

| DE | 2806793 | 8/1979 |
| DE | 4134679 | 4/1993 |
| WO | 9525580 | 9/1995 |
| WO | 0151172 | 7/2001 |

* cited by examiner

*Primary Examiner*—Duane Smith
*Assistant Examiner*—Minh-Chau T. Pham
(74) *Attorney, Agent, or Firm*—Dykema Gossett PLLC

(57) ABSTRACT

A filter bag (1) for a filter device includes a tubular, flexible, air-penetrable filter body (6) provided with a suspension arrangement at an unfolded end thereof. The suspension arrangement includes a rigid ring element (7) with outwardly protruding members 10 annularly secured to the unfolded end of the filter body. The ring element (7) is arranged at least partially at an interior part of the filter body (6). Also a filter device including a housing with a dust chamber (4) and a clean-air chamber (5) that are separated by an partition wall (3) suspending at least one filter bag (1) as described above that extends through an opening (2) provided in the partition wall (3) with a main part of the filter body (6) located in the dust chamber (4). The ring element (7) of the filter bag (1) extends at least partially into the opening (2) in the partition wall (3).

25 Claims, 2 Drawing Sheets

FILTER BAG AND A FILTER DEVICE PROVIDED WITH SUCH FILTER BAG

BACKGROUND OF THE INVENTION

1. Field of the Invention

The invention relates to a filter bag for a filter device, said filter bag comprising a tubular, flexible, air-penetrable filter body provided with a suspension arrangement at an unfolded end thereof, said suspension arrangement comprising a rigid ring element annularly secured to said unfolded end of the filter body. The invention also relates to a filter device comprising a housing with a dust chamber and a clean-air chamber that are separated by an partition wall suspending at least one filter bag that extends through an opening provided in the partition wall with a main part of the filter body located in the dust chamber.

2. The Prior Art

Conventionally, a filter bag with a tubular, flexible, air-penetrable filter body made of e.g. felt has an upper end that is folded about an annular ring consisting of a metal ring and two axially spaced apart bead rings with a layer of filter material between the metal ring and the two bead rings as shown in FIG. 1. The back-folded end of the filter body is sewn to the main part of the filter body below the annular ring. The filter body material between the two bead rings forms a sealing between the filter bag and the partition wall, when the filter bag is mounted in a filter device. These types of filter bags are used in filter devices with CIP (cleaning-in-place) means as well as in filter devices without CIP means. A disadvantage of this type of filter bag is that it is difficult to clean, since the folded end of the filter bag creates a pocket containing the metal ring and the two bead rings. First, the metal ring and the two bead rings are difficult to clean since they are located in the pocket. Second, any undesired material resting inside the pocket—it being particles that have being sewn in during manufacturing of the filter bag or product material that has penetrated through the filter material during operation of the filter device—is difficult to remove during a later cleaning process, such as CIP process. If the deposited material originates from the product it may be necessary first to dissolve the material before it can be rinsed out of the pocket. In fact, during a CIP process the aim is to first dissolve the deposited material and then rinse it out of the pocket. However, even after cleaning there may still be material left in the pocket which may form basis for bacteria growth and an increased amount of bacteria in the final product. This is mostly undesired if the filter bag is used in the food or pharmaceutical industry.

Filter bags with an unfolded filter body are known from WO 01/51172 that discloses a filter bag with an upper end having an unfolded filter body provided with an outer ring-shaped stiffener. When this filter bag is mounted in the filter device the ring-shaped stiffener rests on the upper surface of the partition wall dividing the filter device into a dust chamber and a clean-air chamber while the main body of the filter bag extends into the dust chamber. Since the forces acting on the filter bag are mainly directed from the outside to the interior of the filter bag there is a risk that the filter body is separated from the outer ring-shaped stiffener by tearing or rupturing, thus creating a gap through which dust particles can pass. Measures must therefore be taken to assure that the filter body is not unintentionally separated from the ring-shaped stiffener. In WO 01/51172 this is assured by providing an inner basket with a rigid upper ring that provides support to the inside of the filter body at the area of the ring-shaped stiffener. If no inner ring is provided the forces acting on the filter bag may cause the filter body to be separated from the ring-shaped stiffener, or the ring-shaped stiffener is forced to flex inwards, leaving a gap between the opening in the partition wall and the filter bag. Another disadvantage of the filter device shown in WO 01/51172 is that the small crevice between the upper surface of the partition wall and the ring-shaped stiffener is difficult to clean thoroughly which, again, is mostly undesired especially if the filter device is used in the food or pharmaceutical industry.

It is an object of the present invention to provide a filter bag and a filter device that overcomes the problems associated with the prior art filter bag and filter device.

SUMMARY OF THE INVENTION

This is achieved by arranging the ring element at least partially at an interior part of the filter body, and by ensuring that the ring element, when the filter bag is mounted in a filter device, extends at least partially into the opening in the partition wall.

Thereby is obtained that the filter body will not be unintentionally separated from the ring element due to inwardly acting forces applied to the filter body. In fact, such inwardly directed forces tend to press the filter body further against the ring element rather than trying to separate the filter body from the ring element. Additionally, when the filter device is provided with CIP means, the arrangement with the filter body being provided substantially outside the ring element means that the filter body can be thoroughly rinsed since easy access is provided to all parts of the filter body. This reduces the risk of bacteria growth considerably and makes the filter bag according to the invention particular suitable for use in the food and pharmaceutical industry where the requirements to proper cleaning are very high.

In a first embodiment the ring element is annularly provided with holes and the ring element and the filter body are sewn together. This is a particular simple manner of interconnecting the ring element and the filter body.

In alternative embodiments the ring element and the filter body are glued or welded together, by which methods it is possible to obtain an uninterrupted interconnection between the ring element and the filter body.

The ring element may be moulded, and the filter body may be secured to the ring element during the moulding process of the ring element, whereby a firm interconnection between the ring element and the filter body is achievable.

A particular firm interconnection is obtained if the ring element material protrudes at least partially into the filter body material.

Preferably the ring element is provided with outwardly protruding members for suspending the filter bag at discrete points. This ensures that the filter device can easily be cleaned at the suspension area since the conventionally annular suspension is avoided.

The ring element may be made of any suitable material. Preferably it is made of metal or a plastics material.

The filter bag according to the invention may be arranged in such manner that when it is mounted in an opening in an intermediate wall in filter device the filter body extends through the opening and forms a sealing between the partition wall and the ring element. This sealing allows air to flow through the sealing without reducing the filtering efficiency and also allows a liquid used in a CIP process to remove any deposited material from the filter body in this area. This is particularly true if the filter body is substantially uncompressed in the area between the ring element and the partition wall.

The filter bag according to the invention may also be arranged in such manner that when it is mounted in an opening in an intermediate wall in the filter device, only the ring element of the filter bag extends through the opening in the partition wall, whereas the filter body ends at a distance from the partition wall. In this embodiment the filter body is fully located within the dust chamber of the filter device which means that it can be completely cleaned even if CIP means are provided only in the dust chamber.

In order to ensure that no gaps exist between the ring element and the partition wall, the ring element can be designed to sealingly engage the opening in the partition wall. Alternatively a sealing member may be arranged between the ring element and the opening in the partition wall.

The filter device may be provided with CIP (cleaning-in-place) means, which in particular should include at least one nozzle provided in the dust chamber.

The invention will be described in detail in the following with references to the attached drawings.

DETAILED DESCRIPTION OF THE PREFERRED EMBODIMENT

Figure 1:
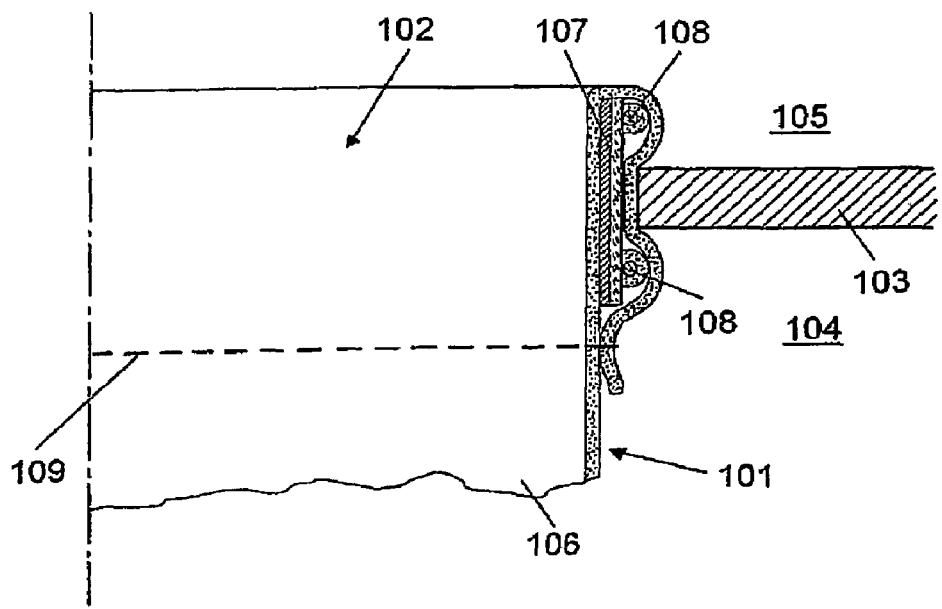
FIG. 1 shows an upper end of a prior art filter bag mounted in an opening in an partition wall in a filter device.

FIG. 1 shows an upper end of a prior art filter bag 101 mounted in an opening 102 in an partition wall 103 in a filter device comprising a dust chamber 104 and a clean-air chamber 105.

The filter bag 101 comprises a tubular, flexible, air-penetrable filter body 106 made of e.g. felt, and it has an upper end that is folded about an annular ring consisting of a metal ring 107 and two axially spaced apart bead rings 108 with a layer of filter material between the metal ring 107 and the two bead rings 108. The back-folded end of the filter body 106 is sewn to the main part of the filter body 106 below the annular ring as indicated with stitching 109. The filter body material between the to bead rings 108 forms a sealing between the filter bag 101 and the partition wall 103 such that dust particles cannot pass from the dust chamber 104 to the clean-air chamber 105 between the filter bag 101 and the partition wall 103.

Figure 2:
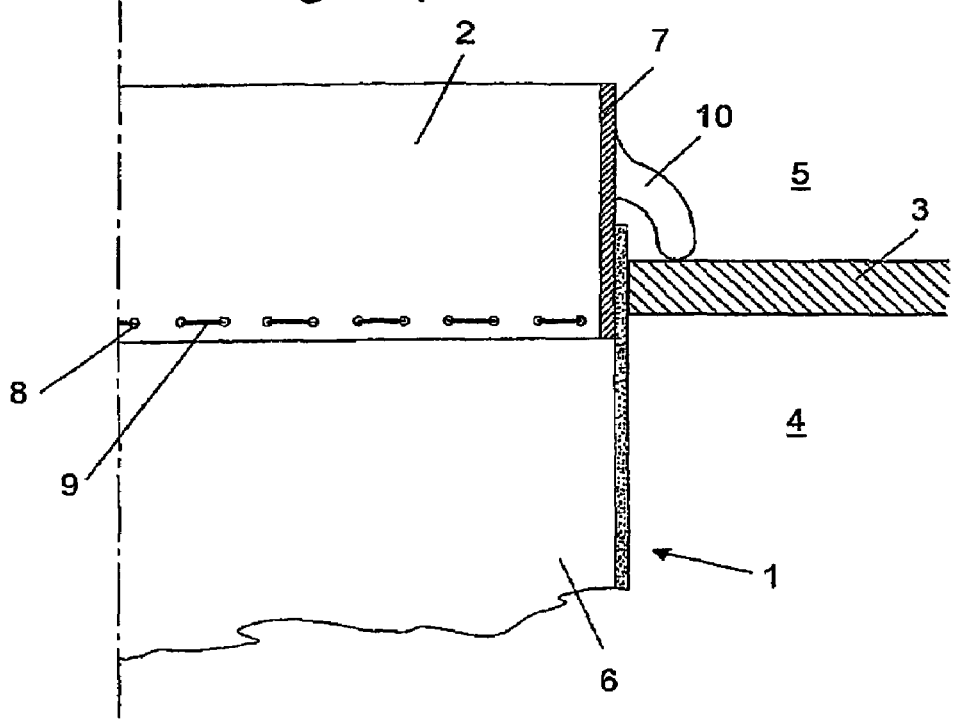
FIG. 2 shows an upper end of a first embodiment of a filter bag according to the invention mounted in an opening in an partition wall in a filter device.

FIG. 2 shows an upper end of a first embodiment of a filter bag a according to the invention mounted in an opening 2 in an partition wall 3 in a filter device comprising a dust chamber 4 and a clean-air chamber 5. The filter device is not shown in detail since a person skilled in the art knows the structure of a filter device incorporating one or more filter bags.

The filter bag 1 comprises a tubular, flexible, air-penetrable filter body 6 made of e.g. felt and a rigid ring element 7. The ring element 7 is at its lower end provided with small holes 8 by means of which the upper unfolded end of the filter body 6 is sewn as indicated with stitching 9. The filter body 6 surrounds the lower end of the ring element 7, i.e. the ring element is located fully within the inner surface of the filter body 6. The ring element 7 is provided with outwardly protruding members 10 for suspending the filter bag 1 at discrete points on the top surface of the partition wall 3 as shown.

When the filter bag 1 is mounted in the opening 2 in the partition wall 3 the ring element 7 as well as the filter body 6 extends through the opening 2. The size of the opening 2 in the partition wall 3 corresponds essentially to the size of the filter bag 1, i.e. the filter body 6 abuts circumferentially on the edge of the opening 2. In order to ensure that no gaps appear between the filter body 6 and the partition wall 3 the size of the opening 2 is preferably a little smaller than the outer size of the filter bag 1, such that a slight compression of the filter body 6 in this area appears. Thereby the filter body 6 forms a sealing between the edge of the opening 2 and the rigid ring element 2. The sealing, however, does not influence the filtering efficiency of the filter bag, and—more importantly—a cleaning liquid used in a CIP process can easily penetrate the filter body 6 and dissolve and remove any undesired material therefrom.

Figure 3:
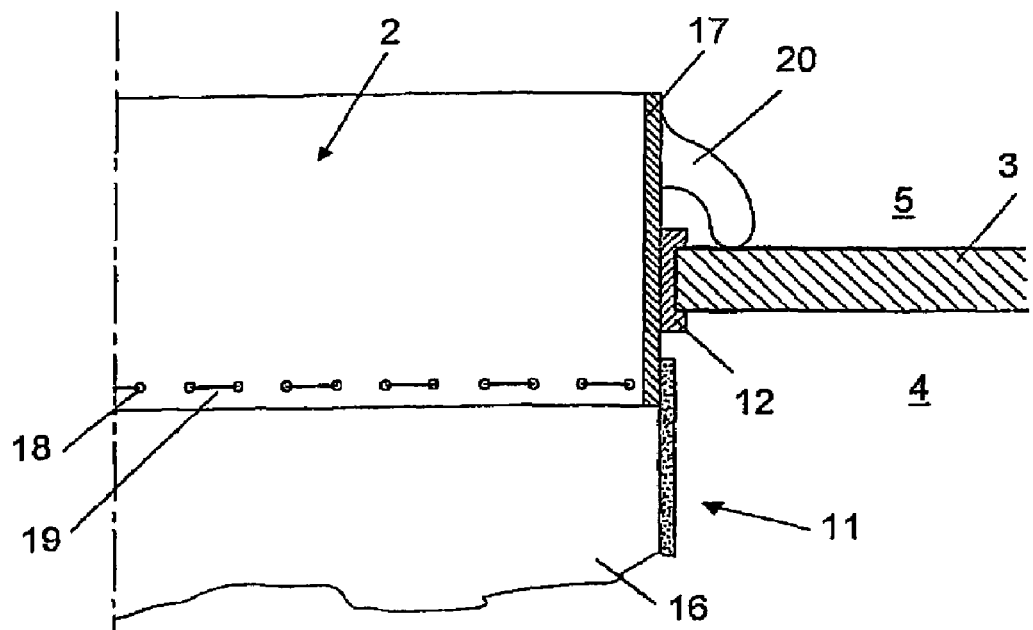
FIG. 3 shows an upper end of a second embodiment of a filter bag according to the invention mounted in an opening in an partition wall in a filter device.

FIG. 3 shows an upper end of a second embodiment of a filter bag 11 according to the invention mounted in an opening 2 in an partition wall 3 in a filter device comprising a dust chamber 4 and a clean-air chamber 5. Again, the filter device is not shown in detail since a person skilled in the art knows the structure of a filter device incorporating one or more filter bags. Furthermore, the same reference numerals are used for the same parts of the filter device as those used in FIG. 2, since these parts may be identical.

The filter bag 11 comprises a tubular, flexible, air-penetrable filter body 16 made of e.g. felt and a rigid ring element 17. The ring element 17 is at its lower end provided with small holes 18 by means of which the upper unfolded end of the filter body 16 is sewn as indicated with stitching 19. The filter body 16 surrounds the lower end of the ring element 17, i.e. the ring element is located fully within the inner surface of the filter body 16. The ring element 17 is provided with outwardly protruding members 20 for suspending the filter bag 11 at discrete points on the top surface of the partition wall 3 as shown.

When the filter bag 11 is mounted in the opening 2 in the partition wall 3 only the ring element 17 extends through the opening 2, whereas the filter body 16 ends at a distance below the intermediate wall 3. A sealing member 12 is arranged between the edge of the opening 2 and the ring element 17 in order to ensure that no gap exists between the ring element 17 and the partition wall 3. The sealing member 12 is preferably made of a flexible material that is slightly compressed when the filter bag 11 is mounted in the opening 2. Therefore, in this embodiment no air can flow between the filter bag 11 and the edge of the opening 2 in the partition wall 3.

An advantage of this embodiment in relation to the first embodiment shown in FIG. 2 is that the filter body 16 is not compressed at all, which means that a liquid used in a CIP process easily penetrates the filter body 16 and dissolves and removes any undesired material therefrom.

Figure 4:
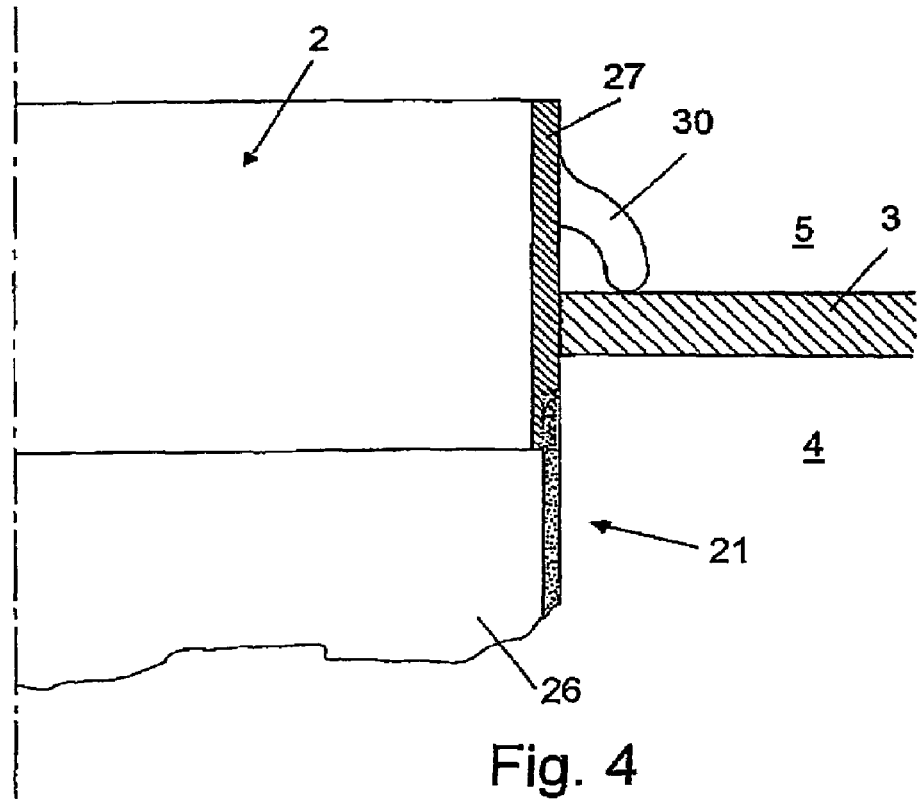
FIG. 4 shows an upper end of a third embodiment of a filter bag according to the invention mounted in an opening in an partition wall in a filter device.

The sealing member 12 shown in FIG. 3 can of course be dispensed with if the outer surface of the ring element 17 is arranged to form a sealing contact with the edge of the opening 2 in the partition wall 3, which in fact is the case in the third embodiment shown in FIG. 4.

FIG. 4 shows an upper end of a third embodiment of a filter bag 21 according to the invention mounted in an opening 2 in an partition wall 3 in a filter device comprising a dust chamber 4 and a clean air chamber 5. Again, the filter device is not shown in detail since a person skilled in the art knows the structure of a filter device incorporating one or more filter bags. Furthermore, the same reference numerals are used for the same parts of the filter device as those used in FIGS. 2 and 3, since these parts may be identical.

The filter bag 21 comprises a tubular, flexible, air-penetrable filter body 26 made of e.g. felt and a rigid ring element 27. In this embodiment the filter body 26 and the ring element 27 are not sewn together as in the embodiments shown in FIGS. 2 and 3. In this embodiment the filter body 26 and the ring element 27 are assembled during a moulding process of the ring element 27. This means that the filter body 26 is provided first, and the end of the filter body 26 is then placed in a mould. The ring element 27 is then moulded in the mould with some of the ring element material penetrating into the filter body 26 as indicated in FIG. 4 to create a firm interconnection between the moulded ring element 27 and the filter body 26.

Like in the first two embodiments the ring element 27 is provided with outwardly protruding members 30 for suspending the filter bag 21 at discrete points on the top surface of the partition wall 3 as shown.

When the filter bag 21 is mounted in the opening 2 in the partition wall 3, only the ring element 27 extends through the opening 2, whereas the filter body 16 ends at a distance below the intermediate wall 3. As mentioned above the outer surface of the ring element 27 fits sealingly into the opening 2 of the partition wall 3 such that no gap exists between the ring element 27 and the partition wall 3.

Also in this embodiment any undesired material can easily be dissolved and/or removed from the filter body 26 by means of a liquid used in a CIP process.

The invention has been described with reference to preferred embodiments shown in FIGS. 2-4. However, the various features shown in these embodiments may be combined differently than shown, and other features may be added to the filter bag.

Also, the filter body and the ring element may be interconnected by other means than by sewing or moulding. The filter body and the ring element can for instance by welded together, especially if they are made of the same weldable material. In this case all interconnections of the filter body can advantageously be welded whereby overlapping filter material can be avoided. Alternatively the filter body and the ring element can be glued together.

The term "unfolded", when used in this specification, is intended to stress that the filter body material does not overlap. It is directed solely to the end of the filter body that is connected to the ring element and does not refer to any other part of the filter body. Despite this fact, other parts of the filter body are preferably also unfolded in order to ensure that the filter body can be thoroughly cleaned.

The invention claimed is:

1. A filter bag for a filter device, said filter bag comprising a tubular, flexible, air-penetrable filter body and a suspension arrangement at an unfolded end of said filter body, said suspension arrangement comprising a rigid ring element arranged at least partially at an interior part of the filter body and being annularly secured to said unfolded end of the filter body substantially without compressing the filter body, said ring element including a plurality of outwardly protruding members for suspending the filter bag at discrete points.

2. A filter bag according to claim 1, wherein the ring element is annularly provided with holes, and the ring element and the filter body are sewn together.

3. A filter bag according to claim 1, wherein the ring element and the filter body are glued together.

4. A filter bag according to claim 1, wherein the ring element and the filter body are welded together.

5. A filter bag according to claim 1, wherein the ring element is moulded.

6. A filter bag according to claim 5, wherein the filter body is secured to the ring element during the moulding process of the ring element.

7. A filter bag according to claim 6, wherein the ring element material protrudes at least partially into the filter body material.

8. A filter bag according to claim 1, wherein the ring element is made of metal.

9. A filter bag according claim 1, wherein the ring element is made of plastics material.

10. A filter device comprising a housing with a dust chamber and a clean-air chamber that are separated by a partition wall suspending at least one filter bag that extends through an opening provided in the partition wall with a main part of the filter bag located in the dust chamber, wherein said filter bag comprises a tubular, flexible, air-penetrable filter body and a suspension arrangement at an unfolded end of said filter, said suspension arrangement comprising a rigid ring element arranged at least partially at an interior part of the filter body and being annularly secured to said unfolded end of the filter body substantially without compressing the filter body, said ring element including a plurality of outwardly protruding members that abut on the partition wall at discrete points, and wherein the ring element of the filter bag extends at least partially into the opening in the partition wall.

11. A filter device according to claim 10, wherein the ring element of the filter bag is annularly provided with holes, and the ring element and the filter body are sewn together.

12. A filter device according to claim 10, wherein the ring element and the filter body of the filter bag are glued together.

13. A filter device according to claim 10, wherein the ring element and the filter body of the filter bag are welded together.

14. A filter device according to claim 10, wherein the ring element of the filter bag is moulded.

15. A filter device according to claim 14, wherein the filter body of the filter bag is secured to the ring element during the moulding process of the ring element.

16. A filter device according to claim 15, wherein the ring element material protrudes at least partially into the filter body material.

17. A filter device according to claim 10, wherein the ring element of the filter bag is made of metal.

18. A filter device according to claim 10, wherein the ring element of the filter bag is made of a plastics material.

19. A filter device according to claim 10, wherein the filter body of the filter bag extends through the opening in the partition wall and forms a sealing between the partition wall and the ring element.

20. A filter according to claim 19, wherein the filter body is substantially uncompressed in the area between the ring element and the partition wall.

21. A filter device according to claim 10, wherein only the ring element of the filter bag extends through the opening in the partition wall, whereas the filter body ends at a distance from the partition wall.

22. A filter device according to claim 21, wherein the ring element sealingly engages the opening in the partition wall.

23. A filter device according to claim 21, wherein a sealing member is arranged between the ring element and the opening in the partition wall.

24. A filter device according claim 10, wherein the filter device is provided with CIP (cleaning-in-place) means.

25. A filter device according to claim 24, wherein the CIP means comprises at least one nozzle provided in the dust chamber.

* * * * *